(12) United States Patent
Plate

(10) Patent No.: US 6,550,101 B2
(45) Date of Patent: Apr. 22, 2003

(54) HYDRAULIC CONSTANT FORCE CASTER

(75) Inventor: Jack R. Plate, Clarklake, MI (US)

(73) Assignee: Ross Design & Engineering, Inc., Cement City, MI (US)

( * ) Notice: Subject to any disclaimer, the term of this patent is extended or adjusted under 35 U.S.C. 154(b) by 0 days.

(21) Appl. No.: 09/917,852

(22) Filed: Jul. 30, 2001

(65) Prior Publication Data

US 2003/0028997 A1 Feb. 13, 2003

(51) Int. Cl.[7] .................... A47B 91/00; B60B 33/00
(52) U.S. Cl. ................ 16/48; 16/19; 16/32; 16/35 D; 16/44; 280/43.17
(58) Field of Search ............... 16/48, 19, 32, 16/35 D, 44, 45; 280/43, 43.17, 763.1

(56) References Cited

U.S. PATENT DOCUMENTS

| | | | | |
|---|---|---|---|---|
| 3,786,951 A | * | 1/1974 | Ruff et al. ............... | 280/43.17 |
| 4,266,627 A | * | 5/1981 | Lauber ................. | 180/8.3 |
| 4,527,829 A | * | 7/1985 | Fanslau et al. ........... | 297/16.1 |
| 4,528,903 A | * | 7/1985 | Lerch .................. | 100/229 R |
| 4,696,484 A | * | 9/1987 | Casey .................. | 280/43.16 |
| 4,711,464 A | * | 12/1987 | Bilas .................. | 180/209 |
| 4,940,110 A | * | 7/1990 | Svensson et al. ......... | 180/209 |
| 4,998,320 A | * | 3/1991 | Lange ................. | 16/35 R |
| 5,116,032 A | * | 5/1992 | Strachan .............. | 254/93 R |
| 5,195,764 A | * | 3/1993 | Schantz et al. .......... | 280/43.22 |

FOREIGN PATENT DOCUMENTS

| | | | |
|---|---|---|---|
| DE | 3106027 A1 | * | 9/1982 |
| DE | 3503028 A1 | * | 7/1986 |
| DE | 19604227 A1 | * | 8/1997 |
| DE | 29918833 U1 | * | 10/1999 |
| EP | 0118608 A1 | * | 9/1984 |
| EP | 0583546 A1 | * | 2/1994 |
| RU | 2108243 C1 | * | 4/1998 |

* cited by examiner

Primary Examiner—Chuck Y. Mah
(74) Attorney, Agent, or Firm—Young & Basile, P.C.

(57) ABSTRACT

A caster system wherein a constant force is applied to the caster for load support purposes. A plurality of casters are interconnected by a fluid conduit system and each caster includes an expansible chamber motor for adjusting the vertical position of the caster. A fluid pressurizing unit communicates with the conduits and an adjustable force compression spring selectively varies the biasing force on the piston to adjust the equal force imposed upon each caster wheel.

4 Claims, 2 Drawing Sheets

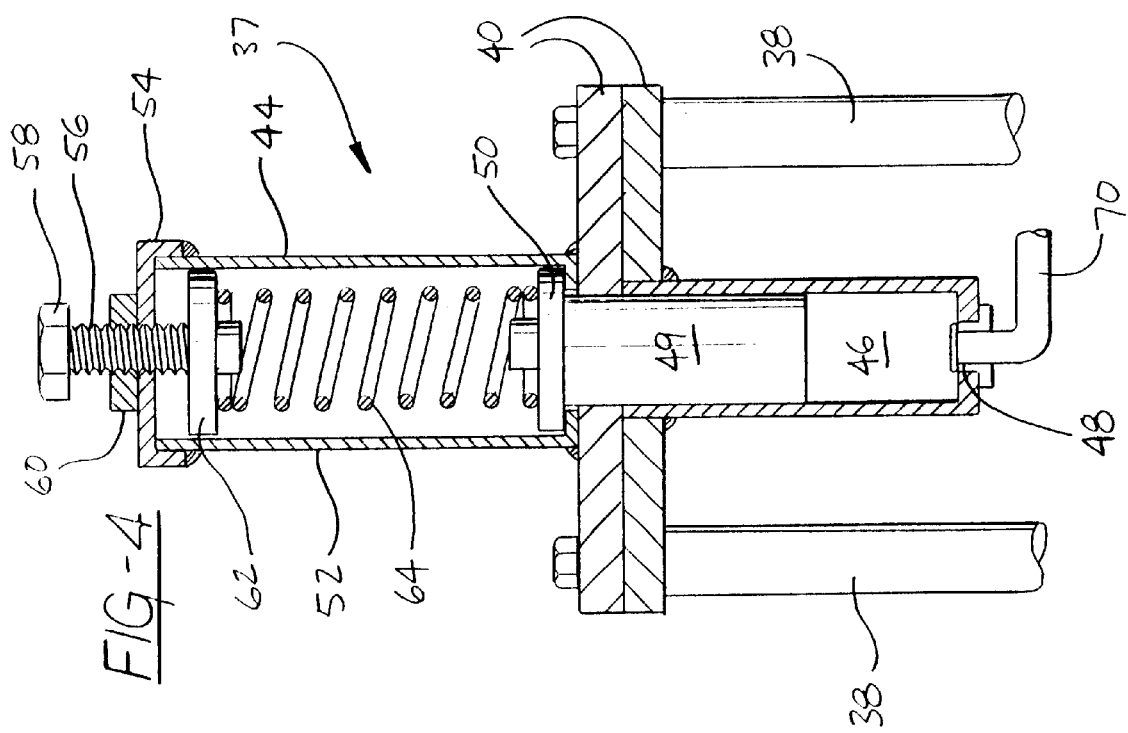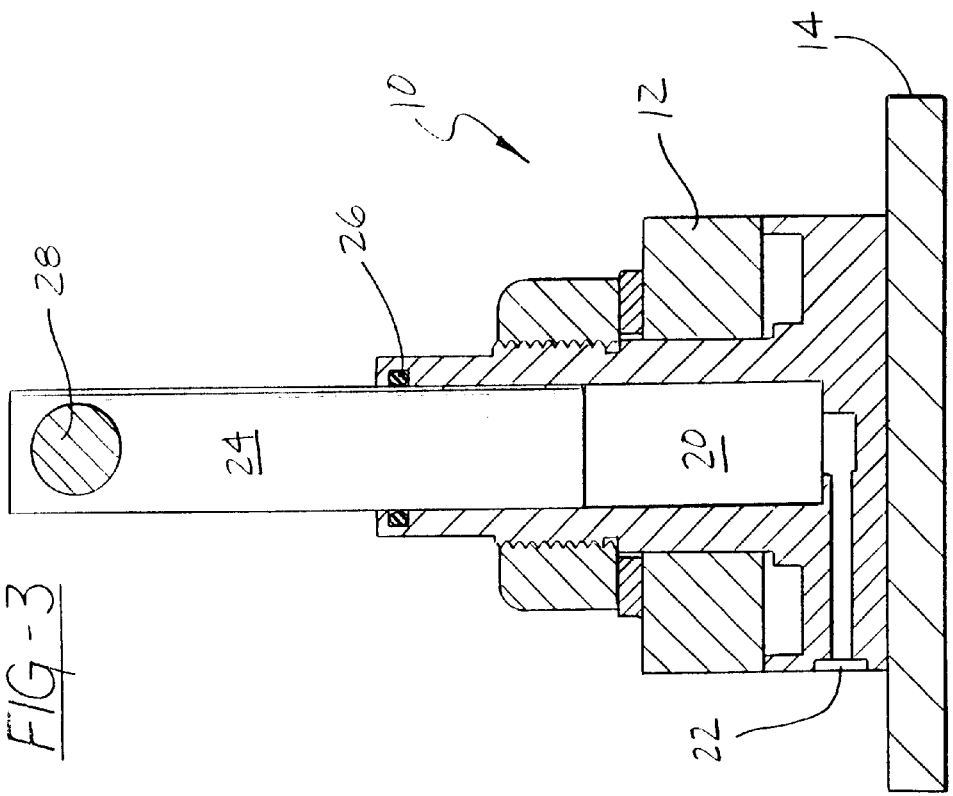

HYDRAULIC CONSTANT FORCE CASTER

FIELD OF THE INVENTION

The invention pertains to casters and caster systems wherein a constant biasing force is imposed upon the caster wheel for load supporting purposes.

DESCRIPTION OF THE RELATED ART

Casters are widely used to support material handling trucks, tables, bins, receptacles, pallet lift trucks, and the like. In some instances, it is desirable that the caster be spring mounted so that shocks may be absorbed, or the weight supported by a specific caster can be adjusted. Where a plurality of casters are simultaneously employed for support purposes, it is usually desirable that each caster exerts the same force upon the load in order to equalize wheel wear and produce uniform load support.

Where casters are individually spring supported, it is very difficult to individually adjust casters so that equal forces are supported by each caster when a plurality of casters are used together for load bearing purposes.

OBJECTS OF THE INVENTION

It is an object of the invention to provide a caster which is vertically adjustable, and wherein the caster load characteristics can be accurately adjusted.

A further object of the invention is to provide a vertically adjustable caster wherein the vertical position of the caster wheel is adjusted by fluid pressure, such as oil pressure, and wherein the pressure upon the fluid supporting the caster can be varied.

Yet another object of the invention is to provide a caster system wherein a plurality of casters are used for load bearing purposes, and wherein the load supporting force of each caster is identical.

An additional object of the invention is to provide a caster system utilizing a plurality of casters wherein a pressurized fluid is used to simultaneously vertically adjust all of the casters in the system, and wherein uniform pressure is employed in all casters for load bearing purposes, and such pressure can be easily adjusted.

SUMMARY OF THE INVENTION

Casters constructed in accord with the inventive concepts utilize a caster housing having a support plate mounted thereon for mounting the caster. The caster housing includes an internal cylindrical chamber defining an expansible chamber motor, and a piston is reciprocally mounted within the chamber. A lever mounted upon the caster housing pivotally supports the caster wheel for vertical adjustment, and the caster piston is affixed to the lever to apply the desired vertical force to the caster wheel. In the disclosed embodiment, one end of the lever is pivotally mounted to the caster housing, while the caster wheel is mounted upon the other end of the lever, and the lever center region is affixed to the caster piston.

The fluid pressure within the caster expansible chamber motor, preferably a hydraulic oil, is pressurized by a pressure unit comprising a cylindrical chamber having a piston reciprocally mounted therein. The pressure unit piston is biased toward the associated chamber by a compression spring whose degree of compressive force is adjustable by a compressing screw.

A plurality of casters constructed in accord with the invention may be interconnected by a common conduit system wherein the internal expansible chambers of each piston housing are in communication, and also in communication with the fluid pressurizing unit. In this instance, each of the caster levers, and caster wheel, is subjected to a common fluid pressurizing force from the pressurizing unit, and thereby a constant biasing force on the load may be imposed by the plurality of interconnected casters regardless of number.

BRIEF DESCRIPTION OF THE DRAWINGS

The aforementioned objects and advantages of the invention will be appreciated from the following description and accompanying drawings wherein:

FIG. 3 is a diametrical, elevational, sectional view taken through a caster housing in accord with the invention, the caster wheel, wheel lever and pivot being omitted for clarity of illustration, and FIG. 4 is a diametrical, elevational, sectional view of the type of pressurizing unit which may be employed with the caster of the invention.

DESCRIPTION OF THE PREFERRED EMBODIMENT

Figure 1:
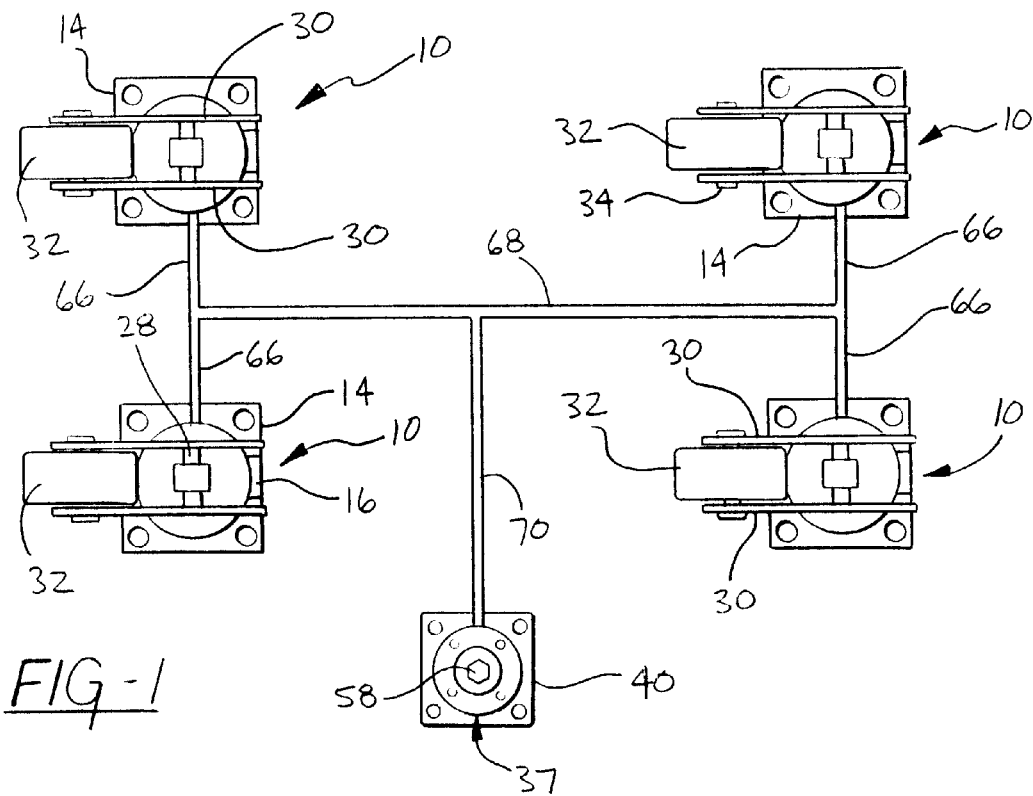
FIG. 1 is a plan view of a caster system using the invention wherein four casters are interconnected to a single pressurizing unit.
Figure 2:
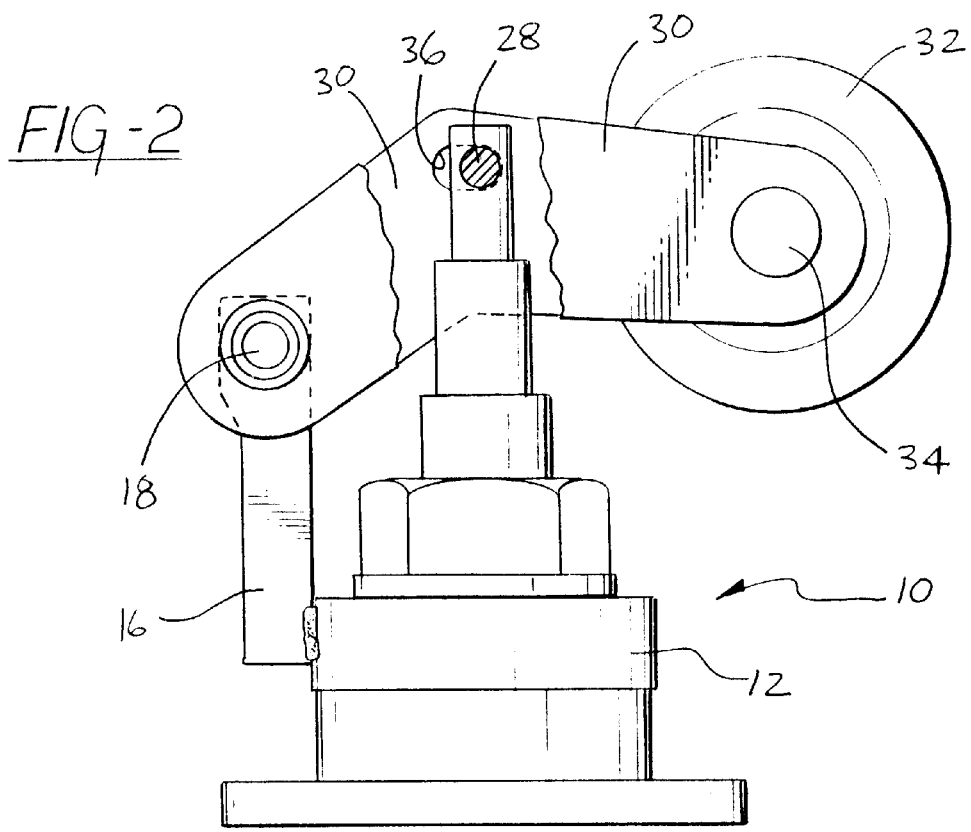
FIG. 2 is a side elevational view, partially broken away, of a single caster constructed in accord with the invention.

A caster unit assembly is generally indicated at 10. Four caster units 10 are illustrated in FIG. 1, while a single caster unit is shown in FIGS. 2 and 3. All of the caster units are identical.

The caster units each consist of a housing 12 having a support plate 14 attached thereto. The support plate 14 includes bolt holes for receiving fasteners wherein the caster unit may be mounted as desired. In the drawings, the caster units 10 are illustrated in a manner wherein the caster wheels are located above the housing 12 whereby a plurality of caster units can be used to support a large workpiece, table, or the like, which is to be moved upon the casters. Of course, the caster units 10 can be mounted in a more conventional manner, 180° from the orientation shown in the drawings, wherein the caster wheel is located below the housing 12. Regardless of the mounting of the caster units to accommodate the particular caster application, the constant pressure imposed upon the caster wheel occurs.

Each housing 12 has a column 16 welded thereto as will be appreciated from FIG. 2, and the upper end of the column 16 includes a pivot shaft 18 for a purpose later described. Interiorly, the housing 12 includes a cylindrical chamber 20 communicating with a threaded port 22. A cylindrical piston 24 is reciprocally received within the chamber 20 and is sealed at 26. It will be appreciated that the chamber 20 and the piston 24 constitute a typical simple expansible chamber motor. A pivot shaft 28 is located at the outer end of the piston 24 as will be appreciated from FIGS. 2 and 3.

A pair of levers 30 are mounted in a spaced parallel relationship and support the rotatable caster wheel 32 at the levers' outer end upon the caster axle 34. The other end of the levers 30 are pivotally connected to the column 16 by pivot shaft 18, FIG. 2, and elongated slots 36, FIG. 2, are defined in the central region of the levers 30 for receiving the piston pivot shaft 28. Accordingly, it will be appreciated that as the piston 24 reciprocates within the chamber 20, the piston shaft 28 acting upon the levers 30 through elongated slots 36 will raise and lower the caster wheel 32 relative to the support plate 14. The elongated configuration of the slots 36 will prevent binding as the levers 30 are operated by the piston.

The caster units 10 are pressurized by a fluid medium, usually hydraulic oil, by a pressure unit 37, FIGS. 1 and 4. The pressure unit 37 is mounted upon support columns 38, and will normally be located in relatively close proximity to the caster units 10 pressurized thereby. The columns 38 support plates 40 by a plurality of bolts 42 threaded into the upper ends of the columns 38.

A cylindrical tube 44 is mounted upon the plates 40 having an open upper end, and a cylindrical chamber 46. A port 48 is located in the lower region of the tube 44 in communication therewith.

A cylindrical piston 49 is reciprocally received within the chamber 46, FIG. 4, and the piston includes an enlarged piston head 50 located above plates 40. A tubular spring jacket 52 is mounted upon the upper plate 40 and includes a cover 54. Centrally, the cover 54 is provided with a threaded hole through which the threaded screw 56 extends. Screw 56 includes hexagonal upper end 50 for application of a wrench thereto in order to rotate the screw 56, and a lock nut 60 threaded upon screw 56 will lock the screw in its desired axial position. The lower of the end screw 56 includes a spring pad 62, FIG. 4, whereby the compression spring 64 housed within the spring jacket 52 will be located between the piston head 50 and the spring pad 62. The extent of compression of spring 64 is determined by the axial position of screw 56 within jacket cover 54. The further the screw extends through the jacket cover, the greater the force imposed by the spring 64 on the piston 49.

With reference to FIG. 1, each of the caster units 10 includes a supply conduit 66 which is attached to the port 22 of each caster unit chamber 20. Each of the supply conduits 66 communicates with the manifold conduit 68, and the pressure unit 73 communicates with the manifold conduit 68 through conduit 70 which is in communication with port 48. Accordingly, it will be appreciated that the pressure imposed upon the fluid within pressure unit chamber 46 will simultaneously be imposed upon all of the caster unit pistons 24, and hence, the caster wheel levers 30.

From the above description, it will be appreciated that the fluid pressure within the chambers 20 of the caster units 10 will be the same in each caster unit as determined by the pressure of the fluid within the pressure unit chamber 46. In this manner, a constant force is imposed on all of the caster unit pistons 24, and hence, the caster wheels 32. The interconnection of all of the caster units 10 by the conduit system assures constant supporting forces on each of the caster assemblies of the caster array, and regardless of whether the caster units 10 are oriented in the position shown in the drawings, reversed, or used in any other orientation, equal forces are created in each of the casters. Of course, it will be appreciated that a pumping movement of the piston 49 will simultaneously increase or decrease the pressure within the caster units 10, and by utilizing various known means for positioning the piston 49, such as by a hydraulic pump, manually operated lever arm, or the like, the casterwheels 32 may be used to simultaneously "jack up" a load, or lower the same.

It will be appreciated that various modifications to the inventive concepts may be apparent to those skilled in the art without departing from the spirit and scope of the invention.

What is claimed is:

1. A caster system characterized by a plurality of casters each exerting the same force upon an object supported by the casters comprising, in combination, a plurality of casters each having a support plate supporting a housing, an expansible chamber motor within said housing having a piston, a caster wheel operatively mounted upon said piston for vertical movement thereby, a conduit system simultaneously interconnecting said expansible chamber motors of said casters so that the pressure within all of said chamber motors is equal and fluid pressurizing means in communication with said conduit system.

2. A caster system as in claim 1, said fluid pressurizing means being adjustable to selectively vary the fluid pressure within said conduit system.

3. A caster system as in claim 2, said fluid pressurizing means comprising an expansible chamber unit having a piston within a cylinder, a compression spring biasing said piston to pressurize fluid within said cylinder and spring adjustment means adapted to selectively vary the biasing force of said spring.

4. A caster system as in claim 1, a lever pivot fixed with respect to said housing, a lever having first and second ends and a central region, said lever being pivotally connected to said lever pivot at said first end, said caster wheel being rotatably mounted on said lever at said second end, said piston being connected to said lever at said central region whereby the position of said caster wheel relative to said support plate is determined by the position of said piston.

* * * * *